United States Patent [19]

Baur et al.

[11] Patent Number: 4,978,805
[45] Date of Patent: Dec. 18, 1990

[54] POLYETHERS

[75] Inventors: Richard Baur, Mutterstadt; Stefan Birnbach, Ludwigshafen; Alfred Oftring, Bad Duerkheim; Ekhard Winkler, Mutterstadt, all of Fed. Rep. of Germany

[73] Assignee: BASF Aktiengesellschaft, Ludwigshafen, Fed. Rep. of Germany

[21] Appl. No.: 363,870

[22] Filed: Jun. 9, 1989

[30] Foreign Application Priority Data

Jun. 11, 1988 [DE] Fed. Rep. of Germany ....... 3820000

[51] Int. Cl.$^5$ .............................................. C07C 43/11
[52] U.S. Cl. ..................................... 568/622; 568/624; 568/619; 568/620; 568/625; 568/678; 568/679
[58] Field of Search ............... 568/619, 620, 622, 625, 568/678, 679

[56] References Cited

U.S. PATENT DOCUMENTS

| 2,932,616 | 4/1960 | Blake | 568/679 |
| 4,241,224 | 12/1980 | Newkirk et al. | 568/619 |
| 4,375,565 | 3/1983 | Greif et al. | 568/622 |

FOREIGN PATENT DOCUMENTS

| 243713 | 11/1987 | European Pat. Off. . |
| 59-076012 | 4/1984 | Japan . |
| 1441835 | 7/1976 | United Kingdom . |

Primary Examiner—Howard T. Mars
Attorney, Agent, or Firm—Oblon, Spivak, McClelland, Maier & Neustadt

[57] ABSTRACT

Polyethers I

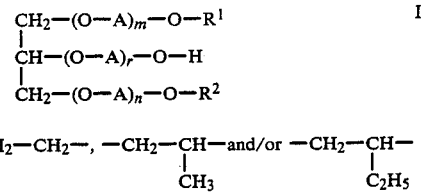

where A is $-CH_2-CH_2-$, $-CH_2-CH(CH_3)-$ and/or $-CH_2-CH(C_2H_5)-$ $R^1$ and $R^2$ are each $C_1$-$C_{20}$-alkyl, n and m are each from 1 to 30 and r is from 0 to 20, are used mainly as surfactants in detergent and cleaning agent formulations.

4 Claims, No Drawings

POLYETHERS

The present invention relates to novel polyethers of the general formula I $$\begin{array}{l} CH_2-(O-A)_m-O-R^1 \\ | \\ CH-(O-A)_r-O-H \\ | \\ CH_2-(O-A)_n-O-R^2 \end{array} \quad I$$

where the radicals A are identical or different units of the structure $$-CH_2-CH_2-, \quad -CH_2-CH- \text{ or } -CH_2-CH- \\ \phantom{-CH_2-CH_2-, \quad -CH_2-}\underset{CH_3}{|} \phantom{\text{ or } -CH_2-}\underset{C_2H_5}{|}$$

$R^1$ and $R^2$ are each $C_1$-$C_{20}$-alkyl, n and m are each from 1 to 30 and r is from 0 to 20.

The present invention furthermore relates to the preparation of the polyethers I and their use as surfactants.

Compounds of the polyether type are generally known. They include the industrially most important nonionic surfactants (cf. for example Ullmann, 4th Edition, Volume 22, page 488 et seq.), among which the alkylphenylpolyethers are particularly important. They have, on the one hand, excellent performance characteristics but on the other hand the disadvantage that they frequently undergo complete biodegradation only slowly. It is for this reason that the chemical industry has decided to dispense with alkylphenylpolyethers as a precautionary measure.

It is an object of the present invention to provide novel polyethers which have advantageous surfactant properties in practice and, inter alia, are suitable for replacing alkylphenylpolyethers.

We have found that this object is achieved by the polyethers I defined at the outset.

We have also found that the polyethers I, together with associative thickeners based on polyetherpolyols, are particularly suitable for the preparation of viscous aqueous cleaning agents having less tendency to run, as employed mainly for particularly stubborn dirt which can only be removed by allowing the cleaner to act for a certain time.

In this area, mixtures of alkylphenylpolyethers having different degrees of polymerization which have been preferred to date not only serve as surfactants but also increase the viscosity of the cleaner.

The fatty alcohol polyethers widely used as non-ionic surfactants lack the last-mentioned property, and these polyethers are therefore suitable as an alkylphenylpolyether substitute for the stated field of use only in combination with thickeners.

While various thickening principles are feasible in alkaline cleaners, this variety is essentially restricted with acidic cleaners to associative thickeners, as described in, for example, EP No.-A1-0061822, WO84/00361 or U.S. Pat. No. 4,398,045.

These are oxyalkylated polyhydric alcohols whose polyether chains carry substituents having hydrophobic terminal groups.

In aqueous solution, hydrophobic groups originating from different molecules presumably lie side by side. Since there is more than one hydrophobic group per molecule, the result is a coarse-mesh network, which is probably responsible for the thickening effect.

In the presence of conventional fatty alcohol polyethers, however, the thickening effect is greatly reduced. Conventional fatty alcohol polyethers carry, per molecule, only one hydrophobic group which, in the case of associative interaction with a hydrophobic end of a thickener molecule, terminates the network at this point.

The novel polyethers I having two hydrophobic ends permit much more effective thickening since they do not terminate the thickener network but can only loosen it.

Preferred polyethers I are those in which A is $-CH_2-CH_2-$ and/or $R^1$ and $R^2$ are each $C_9$-$C_{15}$-alkyl, and/or those in which the radicals $-(O-A)_m-O-R^1$ and $-(O-A)_n-O-R^2$ are identical.

The novel compounds I are obtained by converting a polyether II $$H-(O-A)_n-O-R^1 \quad II$$

or a mixture of different polyethers II ($n \neq m$; $R^1 \neq R^2$) into the associated alkali metal salt, and reacting the polyether III $$\begin{array}{l} CH_2-(O-A)_m-O-R^1 \\ | \\ CH-OH \\ | \\ CH_2-(O-A)_n-O-R^2 \end{array} \quad III$$

obtained therefrom by reaction with epichlorohydrin, with r moles of ethylene oxide, 1,2-propylene oxide, 1,2-butylene oxide or a mixture of these alkylene oxides.

m, n and r each indicate the mean degree of oxyalkylation, i.e. as a rule a mixture of different compounds III or I are obtained. However, it is also possible, and may be necessary for special purposes, to prepare pure compounds III or I by a conventional method.

The alkali metal salt is advantageously obtainable by neutralization with an aqueous hydroxide solution, and 2 moles of salt are preferably used per mole of epichlorohydrin in the reaction with epichlorohydrin, the reaction temperature being kept at 20°-80° C., preferably 30°-40° C. The subsequent oxyalkylation is advantageously carried out in the presence of a basic catalyst, for example by means of from 0.1 to 0.5% by weight, based on the amount of compound III used, of KOH. Otherwise, the oxyalkylation of an alcohol is one of the standard operations of preparative chemistry, so that no further explanations are required here.

The novel compounds I and their mixtures are nonionic surfactants and as such are important in all areas of industry where surfactants are indispensible assistants. For example, they are suitable as surfactants in detergents and cleaning agents, for the preparation of emulsions, pigment dispersions and plastics dispersions and for the preparation of formulations of active ingredients from hydrophilic and hydrophobic components.

Their principal use is in detergents and cleaning agents. The novel substances are added to the corresponding formulations preferably in amounts of from 1 to 50, in particular from 5 to 45%, by weight. Anionic surfactants, such as $C_8$-$C_{12}$-alkylbenzenesulfonates, $C_{12}$-$C_{16}$-alkylsulfates or $C_{12}$-$C_{16}$-alkanesulfonates, substances for supporting the surfactants and for softening the water, such as sodium triphosphate, zeolites, sodium carbonate, polycarboxylic acids, nitrilotriacetic acid, citric acid and monomeric, oligomeric or polymeric phosphonates, bleaches, corrosion inhibitors, antiredeposition inhibitors, antifoams, dirt-binding substances and, if required, other conventional assistants may also be present as further components.

The novel polyethers I are particularly advantageously used together with associative thickeners based on polyetherpolyols for the preparation of viscous aqueous cleaning agents.

They are preferably combined with associative thickeners, which can be obtained by oxyalkylation of polyhydric alcohols having 2 to 10 carbon atoms and 2 to 6 hydroxyl groups with ethylene oxide and/or further alkylene oxides of 3 or 4 carbon atoms, followed by conversion of the terminal hydroxyl groups of the resulting polyether intermediate into hydrophobic groups by reaction with 1,2-alkylene oxides, alkyl glycidyl ethers and/or alkenyl glycidyl ethers of 8 to 30 carbon atoms. The molecular weight of these thickeners is in general from 1,000 to 75,000, the proportion of hydrophobic groups being about 0.5–75% by weight. Thickeners in which a degree of oxyalkylation of from 0.5 to 5 per (—OH) group has been achieved in rendering the terminal hydroxyl groups hydrophobic have proven particularly useful.

Suitable polyfunctional alcohols on which these thickeners are based are, in particular, alkanepolyols, such as ethane-1,2-diol, propane-1,2-diol, butane-1,2-diol, butane-1,3-diol, butane-1,4-diol, trimethylolpropane, pentaerythritol, glycerol, 2,3,4,5-hexanetetrol and glucose, alkenepolyols, such as but-2-ene-1,4-diol, hex-2-ene-1,4,6-triol, hexa-1,5-diene-3,4-diol and hept-3-ene-1,2,6,7-tetrol, and alkynepolyols, such as but-2-yne-1,4-diol, hex-2-yne-1,4,6-triol and oct-4-yne-1,2,7,8-tetrol.

In addition to ethylene oxide, propylene oxide, 1,2-butylene oxide, 2,3-butylene oxide, 1,3-butylene oxide and tetrahydrofuran are particularly suitable for the basic oxyalkylation of the polyols. Mixtures which contain ethylene oxide and propylene oxide in a weight ratio of 70:30 to 95:5 are preferably used.

Examples of suitable long-chain 1,2-alkylene oxides are 1,2-epoxyoctane, 1,2-epoxydodecane, 1,2-epoxyhexadecane and 1,2-epoxyoctacosane.

Examples of alkyl glycidyl ethers having a longchain alkyl group are dodecyl, tetradecyl, hexadecyl, octadecyl, eicosyl, 2-methyldodecyl, 2-methyltetradecyl, 2-methylpentadecyl, 2-hexyldecyl and 2-octyldodecyl glycidyl ether. Examples of alkenyl glycidyl ethers are oleyl glycidyl ether and undecylaryl glycidyl ether. The preparation of such alkyl or alkenyl glycidyl ethers is described in U.S. Pat. No. 4,086,279.

Of particular interest are acidic cleaners which contain
from 5 to 25% by weight of polyether I
from 5 to 50% by weight of a water-soluble acid
from 1 to 10% by weight of an associative thickener based on a polyetherpolyol and
from 0 to 5% by weight of conventional assistants, the remainder being water.

Acidic cleaners are used in particular for removing basic deposits. Preferred acids are hydrochloric acid, phosphoric acid and phosphoric esters, sulfuric acid, oxalic acid, citric acid, formic acid, amidosulfonic acid, adipic acid, glutaric acid and succinic acid.

Another advantageous property of the novel polyethers I is their relatively low foaming power, which is advantageous in particular in alkaline cleaning processes with high mechanical stress.

The ability of the polyethers I to reduce the foaming power of other active ingredients in aqueous solution is presumably closely related to this relatively low intrinsic foaming power. This is advantageous when, because of various advantageous performance characteristics, the presence of these active ingredients is desirable but their foaming power would be a disadvantage.

Polyethers I in which the radical

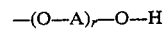

has a low degree of oxyalkylation have a particularly pronounced antifoam action. Polyethers I where r is 0 are particularly preferably used owing to their foam-suppressing power.

A frequent problem in surfactant/water mixtures is that separation occurs above a certain temperature, with the result that the cleaning effect is impaired. This limiting temperature is referred to as the turbidity temperature. It is dependent on the concentration of the surfactant and is determined for characterizing the surfactant, usually according to DIN No. 53,917, for a surfactant/water mixture having a surfactant content of 1% by weight. The novel polyethers I where r=0 are preferred, being surfactants having relatively high turbidity temperatures.

EXAMPLES 1 TO 7

Example 1

A tridecanol isomer mixture was reacted in a conventional manner with ethylene oxide to give an oxyethylation product having a degree of oxyethylation n of 8. 1.4 kg (=2.42 moles of OH) of this product were first reacted with 0.21 kg of 50% strength by weight sodium hydroxide solution at room temperature and were then reacted with 116 kg (1.26 moles) of epichlorohydrin at from 50° to 60° C.

The inorganic components (NaCl and NaOH) were extracted with water from this mixture, after which the residual water was removed by distillation under reduced pressure. The product (about 1.4 kg), which was filtered to remove residual amounts of salt, was obtained in the form of a clear viscous liquid and was of the formula

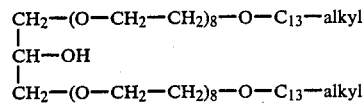

112 g (2.55 moles) of ethylene oxide were added to 511 g of this product (=0.511 mole of OH) together with 0.9 g of potassium hydroxide at from 110° to 115° C. and under 6 bar in the course of 8 hours, after which the reaction mixture was kept at from 110° to 115° C. for a further 3 hours.

The reaction product (about 620 g) was of the formula

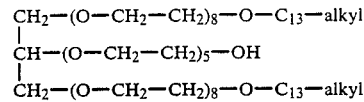

Examples 2 to 7 of the novel surfactants, which are shown in Table 1, were prepared in a similar manner.

Table 1 shows the important properties, such as their turbidity temperature (according to DIN No. 53,917), their foaming power (according to DIN No. 53,902 at 25°±2° C. with 2 g of surfactant per 1 of water and water of hardness 10° of German hardness according to DIN No. 53,910, Sheet 1), their wetting power (according to DIN No. 53,901 with 2 g of surfactant per 1 of water at 20°±2° C.) and their ability to reduce surface tension (according to DIN No. 53,914 with 0.1 g of surfactant per 1 of water at 20°±2° C.). The conventional fatty alcohol polyethers, which in the present case were reacted with epichlorohydrin, were included in the Table for comparison (Examples I to IV).

50% by weight of oxyethylated nonylphenol with n=9 was included as an additional comparative surfactant V.

The associative thickener used was a polyetherpolyol mixture having a mean molecular weight of about 17,000 (calculated from the amount of starting components weighed in) and obtained by oxyalkylating 2,2-bis-(hydroxymethyl)-butan-1-ol with a mixture consisting of 80% by weight of ethylene oxide and 20% by weight of propylene oxide, the mean degree of oxyalkylation being 120 per OH group, and then rendering the product hydrophobic with a mixture of 1,2-alkylene oxides of 15 to 18 carbon atoms, the mean degree of oxyalkylation being 1 per OH group.

The dynamic viscosities of these cleaner formulations

TABLE 1

| Example | $R^1, R^2$ | n | r | Turbidity temperature [°C.] | Foaming power [cm$^3$] | Wetting power [sec] | Surface tension [mN/m] |
|---|---|---|---|---|---|---|---|
| 1 | C$_{13}$-alkyl | 8 | 5 | 38 | 170 | 15 | 31.7 |
| 2 | C$_{13}$-alkyl | 8 | 10 | 48 | 210 | 48 | 35.0 |
| 3 | C$_{13}$-alkyl | 8 | 0 | <25 | 50 | 96 | 30.8 |
| I | C$_{13}$-alkyl | 8 | — | 60 | 500 | 30 | 30.6 |
| 4 | C$_{13}$-alkyl | 5 | 15 | 56 | 280 | 57 | 32.7 |
| 5 | C$_{13}$-alkyl | 5 | 0 | <25 | 20 | 41 | 33.5 |
| II | C$_{13}$-alkyl | 5 | — | <25 | 60 | 50 | 31.8 |
| 6 | C$_{10}$-alkyl | 5 | 5 | 43 | 30 | 7 | 30.9 |
| 7 | C$_{10}$-alkyl | 5 | 10 | 63 | 300 | 15 | 31.2 |
| III | C$_{10}$-alkyl | 5 | — | 30 | 400 | 20 | 30.5 |
| 8 | C$_{10}$-alkyl | 7 | 10 | 61 | 120 | 18 | 32.1 |
| 9 | C$_{10}$-alkyl | 7 | 15 | 75 | 240 | 29 | 32.1 |
| 10 | C$_{10}$-alkyl | 7 | 0 | <25 | 30 | 49 | 27.3 |
| IV | C$_{10}$-alkyl | 7 | — | 60 | 530 | 25 | 30.0 |

Example 8

Comparison of the viscosity of various acidic cleaner formulations were determined using a Searle type rotational viscometer at 20° C. and at a velocity gradient of 150 s$^{-1}$. The results are summarized in Table 2.

TABLE 2

| Surfactant according to Example | — | I | 1 | 2 | 3 | II | 4 | 5 | III | 6 | 7 | IV | 8 | 9 | 10 | V |
|---|---|---|---|---|---|---|---|---|---|---|---|---|---|---|---|---|
| Viscosity [mPa.s] Formulation type A, C | about 7000 | 1079 | 2065 | 1630 | 2430 | 1448 | 2742 | 1870 | 160 | 220 | 283 | 106 | 283 | 472 | 543 | — |
| Viscosity [mPa.s] Formulation type B | — | 49 | 151 | 50 | 180 | 121 | 19 | 143 | 21 | 14 | 7 | 14 | 16 | 14 | 71 | 480 |

Acidic cleaners A having the following composition were prepared using the surfactants according to Examples 1 to 10 and I to IV:
65% by weight of water
20% by weight of phosphoric acid
10% by weight of surfactant
5% by weight of thickener.

Formulations B without a thickener and consisting of
65% by weight of water
20% by weight of phosphoric acid
15% by weight of surfactant
and formulation C without a surfactant and consisting of
75% by weight of water
20% by weight of phosphoric acid
5% by weight of thickener
were used for comparison.

In the case of the cleaners B, an alkylphenylpolyether mixture consisting of
50% by weight of oxyethylated nonylphenol with n32 7 and

Example 9

Investigation of the foam-inhibiting action of various surfactants

These investigations were carried out by a method corresponding to DIN No. 53,902 (determination of the foaming power of surfactants) at 25°±2° C. and using water of 10° German hardness according to DIN No. 53,910, Sheet 1.

On the one hand, the foaming power of aqueous solutions which contained, per 1 of water, 0.15 g of a highly foaming surfactant and in addition 0.15 g of the surfactant whose foam-suppressing action was to be tested and, on the other hand, the foaming power of an aqueous solution which contained only 0.15 g of the highly foaming surfactant per 1 of water were determined.

The sodium salt of n-dodecylbenzenasulfonic acid (Example VI) was used as the surfactant with a pronounced foaming power. The results obtained are shown in Table 3.

TABLE 3

| Surfactant according to Example | Foaming volume [cm³] |
|---|---|
| VI | 390 |
| VI + 3 | 60 |
| VI + 5 | 70 |
| VI + 10 | 110 |
| VI + IV | 440 |

We claim:

1. A polyether of the formula I $$\begin{array}{l} CH_2-(O-A)_m-O-R^1 \\ |\\ CH-(O-A)_r-O-H \\ |\\ CH_2-(O-A)_n-O-R^2 \end{array} \qquad I$$

where the radicals A are identical or different units of the structure $$-CH_2-CH_2-,\ -CH_2-\underset{\underset{CH_3}{|}}{CH}- \text{ or } -CH_2-\underset{\underset{C_2H_5}{|}}{CH}-$$

$R^1$ and $R^2$ are each $C_9$–$C_{20}$-alkyl, n and m are each from 1 to 30 and r is from 0 to 20.

2. A polyether as claimed in claim 1, wherein A is $-CH_2-CH_2-$.

3. A polyether as claimed in claim 1, wherein $R^1$ and $R^2$ are each $C_9$–$C_{15}$-alkyl.

4. A polyether as claimed in claim 1, wherein the radicals $-(O-A)_m-O-R^1$ and $(-O-A)_n-O-R^2$ are identical.

* * * * *